US010775525B2

(12) United States Patent
Wang et al.

(10) Patent No.: US 10,775,525 B2
(45) Date of Patent: Sep. 15, 2020

(54) IDENTIFYING AND VISUALLY PRESENTING FORMATION SLOWNESS BASED ON LOW-FREQUENCY DISPERSION ASYMPTOTES

(71) Applicant: HALLIBURTON ENERGY SERVICES, INC., Houston, TX (US)

(72) Inventors: Ruijia Wang, Singapore (SG); Chung Chang, Houston, TX (US); John Philip Granville, Humble, TX (US); Gary Wayne Kainer, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 309 days.

(21) Appl. No.: 16/068,967

(22) PCT Filed: Mar. 28, 2017

(86) PCT No.: PCT/US2017/024579
§ 371 (c)(1),
(2) Date: Jul. 10, 2018

(87) PCT Pub. No.: WO2017/172799
PCT Pub. Date: Oct. 5, 2017

(65) Prior Publication Data
US 2019/0025451 A1 Jan. 24, 2019

Related U.S. Application Data

(60) Provisional application No. 62/317,222, filed on Apr. 1, 2016.

(51) Int. Cl.
*G01V 1/50* (2006.01)
*G01V 1/48* (2006.01)
*G01V 1/44* (2006.01)

(52) U.S. Cl.
CPC ............. *G01V 1/50* (2013.01); *G01V 1/44* (2013.01); *G01V 1/48* (2013.01); *G01V 2200/14* (2013.01);
(Continued)

(58) Field of Classification Search
CPC ... G01V 1/50; G01V 1/44; G01V 1/48; G01V 1/40; G01V 2200/14; G01V 2210/47;
(Continued)

(56) References Cited

U.S. PATENT DOCUMENTS 4,131,875 A * 12/1978 Ingram .................... G01V 1/44
367/35
4,338,664 A * 7/1982 Mayer ................. G01V 11/002
324/351
(Continued)

OTHER PUBLICATIONS

International Search Report and Written Opinion; PCT Application No. PCT/US2017/024579; dated Mar. 28, 2017.

*Primary Examiner* — Manuel L Barbee
(74) *Attorney, Agent, or Firm* — Polsinelli PC

(57) ABSTRACT

Techniques for estimating and visually presenting formation slowness are disclosed herein. The techniques include receiving acoustic signal responses from adjacent formations at a plurality of depths in a borehole environment, mapping a distribution of the acoustic signal responses at each depth according to slowness and a frequency values, determining at least one confidence interval to define a coherence threshold for the distribution of the acoustic signal responses at each depth, generating a variable density log for each depth based on the distribution of acoustic signals responses that satisfy the confidence interval for one or more frequency ranges, determining a formation slowness value for each depth based on the variable density log for the each depth, and presenting a semblance map that includes a slowness axis, a depth axis, the formation slowness value for (Continued)

each depth, and at least a portion of the distribution of acoustic signal responses at each depth.

20 Claims, 8 Drawing Sheets

(52) U.S. Cl.
CPC .. *G01V 2210/47* (2013.01); *G01V 2210/6224* (2013.01); *G01V 2210/74* (2013.01)

(58) Field of Classification Search
CPC ..... G01V 2210/6224; G01V 2210/667; G01V 2210/74
See application file for complete search history.

(56) References Cited

U.S. PATENT DOCUMENTS

| | | | |
|---|---|---|---|
| 2003/0018433 A1 | 1/2003 | Blanch et al. | |
| 2005/0254343 A1 | 11/2005 | Saiki et al. | |
| 2005/0261835 A1 | 11/2005 | Wang | |
| 2008/0010021 A1 | 1/2008 | Zheng et al. | |
| 2008/0027650 A1 | 1/2008 | Huang et al. | |
| 2013/0138405 A1* | 5/2013 | Holland | E21B 49/087 703/2 |
| 2014/0076632 A1* | 3/2014 | Wessling | E21B 47/06 175/48 |

\* cited by examiner

IDENTIFYING AND VISUALLY PRESENTING FORMATION SLOWNESS BASED ON LOW-FREQUENCY DISPERSION ASYMPTOTES

CROSS-REFERENCE TO RELATED APPLICATIONS

This application is a national stage entry of PCT/US2017/024579 filed Mar. 28, 2017, said application is expressly incorporated herein in its entirety.

TECHNICAL FIELD

The present disclosure pertains to acoustic or sonic logging in a wellbore environment, and more specifically, to processing and visually presenting acoustic or sonic signal response information for reliable quality-control (QC) and efficient validation.

BACKGROUND

Acoustic or sonic logging tools are often employed in wellbore environments for a variety of purposes, including formation measurements and material characterizations. In general, acoustic logging tools are disposed in a borehole and operate to generate/receive signals and measure signal responses (or signal dispersions) for different target modes. The signal responses or signal dispersions for a given target mode are further analyzed to determine various geophysical and mechanical properties of the borehole as well as adjacent formations. Signal dispersions are often characterized by a relationship between signal wave slowness (µs/ft) and signal wave frequency, which provides insight into material-types and geometric properties of the borehole as well as the adjacent formations. Put differently, the signal wave slowness (for a given target mode) depends upon its frequency. For example, signal responses from soft formation dipole logging may include both a leaky P mode and a dipole shear mode waveforms, where the dipole shear mode waveforms are typically more dispersive than the leaky P mode waveforms.

It is also appreciated certain target mode waveforms result in signal responses that indicate a low frequency asymptote or limit, and further, such low frequency asymptote approaches a shear wave formation slowness for the surrounding rock formation. As such, the low frequency asymptote may be used to estimate or otherwise indicate the formation slowness (or other properties) of the surrounding formation. However, certain challenges (e.g., noise, interference, scattering due to borehole radius changes, non-suppressed waves, etc.) hinder and complicate reliably extraction and validation processes, particularly extracting and validating signal dispersions at low frequencies.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
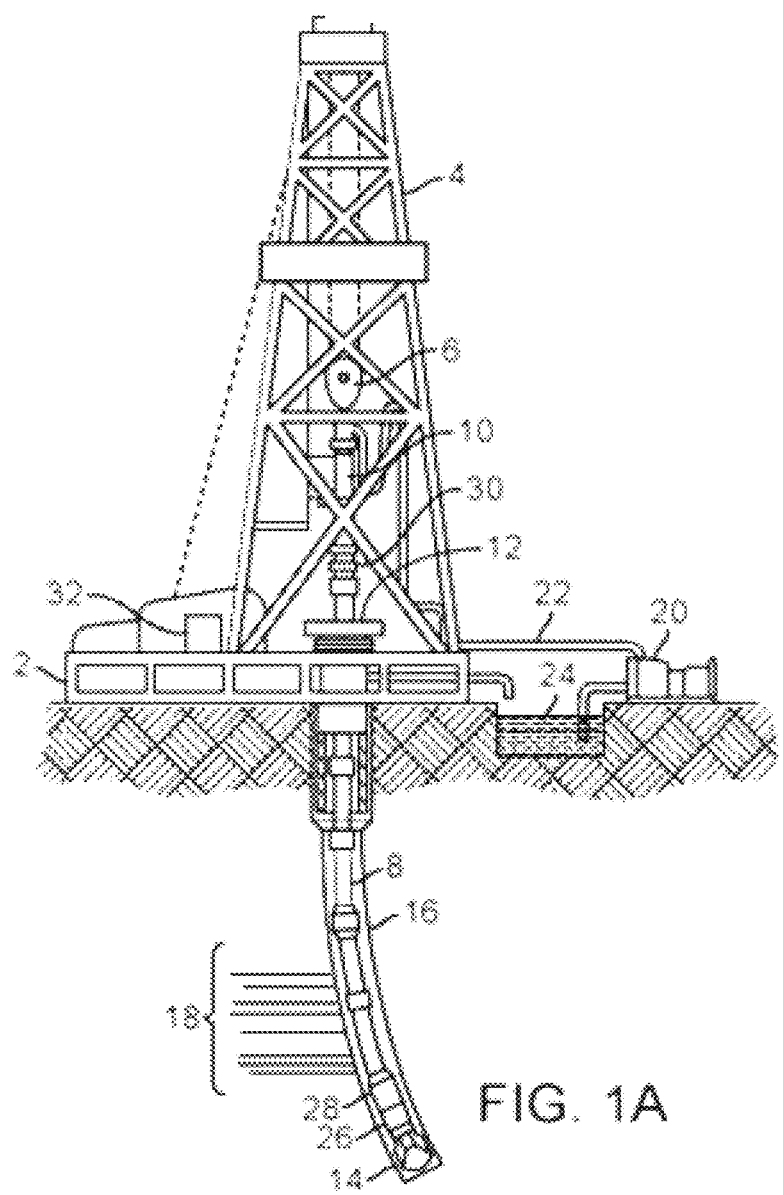
FIG. 1A is a schematic diagram of an example logging-while-drilling (LWD) environment.

As discussed in greater detail herein, the present disclosure provides techniques to extract, analyze, and validate signal or dispersion responses for acoustic or sonic wellbore tools. In particular, the techniques disclosed herein use 2D frequency semblance or coherence calculations to generate a quality control (QC) log display that allows users to visually validate signal or dispersion response results (e.g., real-time frequency domain information). For example, this disclosure provides innovative mapping operations to generate log display maps or plots, which include display enhancements (e.g., colors, highlights, etc.), and identify signal response characteristics such as a flatness of dispersion responses (e.g., indicated by slowness vs. depth coordinate positions).

In addition to the foregoing, the techniques disclosed herein generally analyze distributions of signal responses to identify low-frequency asymptotes at one or more borehole depths, select a slowness value (µs/ft) for each borehole depth that corresponds to its low-frequency asymptote, and present a visual map that highlights the selected slowness values according to slowness (µs/ft) versus depth (ft.) dimensions. If the selected slowness value falls along an edge of a high color contrast zone in the visual map, it indicates that the value or answer is indeed extracted from the low frequency asymptote of the dispersion response. Importantly, the techniques disclosed herein are not limited to dipole shear logging, but may also be applied to other types of wave propagating modes such as quadrupole waves in any formation or leaky-P waves in soft formations, and the like.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

The disclosure now turns to FIGS. 1A-B and 2A-B to provide a brief introductory description of the larger systems and computing devices which can be employed to practice the concepts, methods, and techniques disclosed herein. A more detailed description of the presently disclose slowness dispersion asymptote and low frequency answer validation will then follow.

FIG. 1A shows an illustrative logging while drilling (LWD) environment. A drilling platform 2 supports a derrick 4 having a traveling block 6 for raising and lowering a drill string 8. A kelly 10 supports drill string 8 as it is lowered through a rotary table 12. A drill bit 14 is driven by a downhole motor and/or rotation of drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into pit 24 and aids in maintaining the borehole integrity.

A downhole tool 26 may take the form of a drill collar (i.e., a thick-walled tubular that provides weight and rigidity to aid the drilling process) or other arrangements known in the art. Further, downhole tool 26 may include acoustic (e.g., sonic, ultrasonic, etc.) logging tools and/or corresponding components, integrated into the bottom-hole assembly near bit 14. In this fashion, as bit 14 extends the borehole through formations, the bottom-hole assembly (e.g., the acoustic logging tool) can collect acoustic logging data. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics.

For purposes of communication, a downhole telemetry sub 28 can be included in the bottom-hole assembly to transfer measurement data to a surface receiver 30 and to receive commands from the surface. Mud pulse telemetry is one common telemetry technique for transferring tool measurements to surface receivers and receiving commands from the surface, but other telemetry techniques can also be used. In some embodiments, telemetry sub 28 can store logging data for later retrieval at the surface when the logging assembly is recovered.

At the surface, surface receiver 30 can receive the uplink signal from the downhole telemetry sub 28 and can communicate the signal to a data acquisition module 32. Module 32 can include one or more processors, storage mediums, input devices, output devices, software, and the like as described in detail in FIGS. 2A and 2B. Module 32 can collect, store, and/or process the data received from tool 26 as described herein.

Figure 1B:
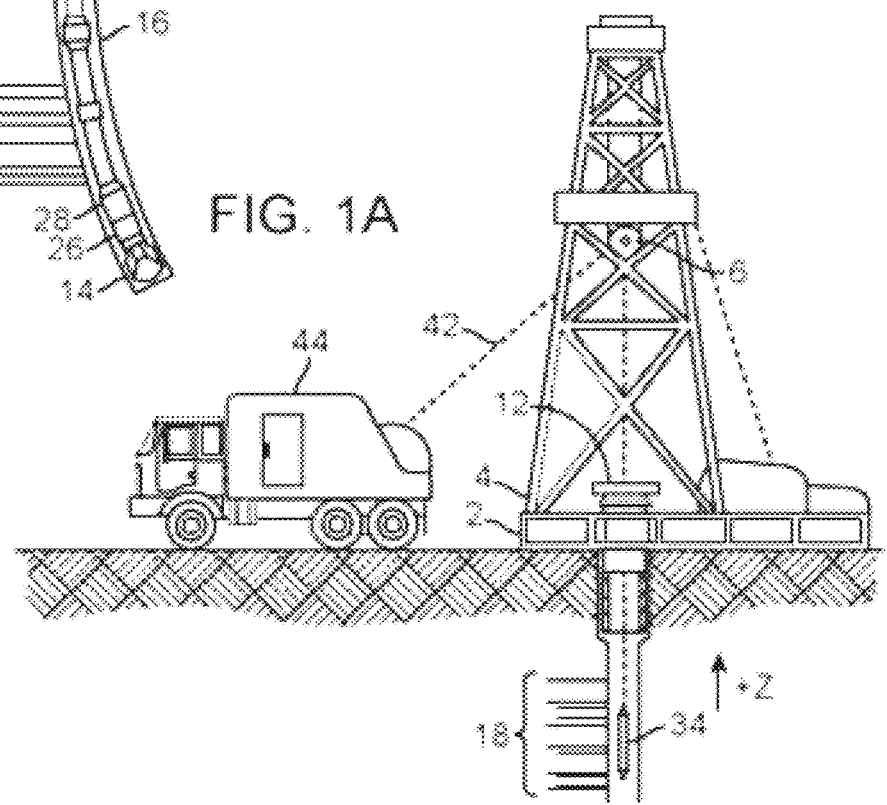
FIG. 1B is a schematic diagram of an example wireline logging environment.

At various times during the drilling process, drill string 8 may be removed from the borehole as shown in FIG. 1B. Once drill string 8 has been removed, logging operations can be conducted using a downhole tool 34 (i.e., a sensing instrument sonde) suspended by a conveyance 42. In one or more embodiments, the conveyance 42 can be a cable having conductors for transporting power to the tool and telemetry from the tool to the surface. Downhole tool 34 may have pads and/or centralizing springs to maintain the tool near the central axis of the borehole or to bias the tool towards the borehole wall as the tool is moved downhole or uphole.

Downhole tool 34 can include an acoustic or sonic logging instrument that collects acoustic logging data within the borehole 16. A logging facility 44 includes a computer system, such as those described with reference to FIGS. 2A and 2B, for collecting, storing, and/or processing the measurements gathered by logging tool 34. In one or more embodiments, the conveyance 42 of the downhole tool 34 may be at least one of wires, conductive or non-conductive cable (e.g., slickline, etc.), as well as tubular conveyances, such as coiled tubing, pipe string, or downhole tractor. The downhole tool 34 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval.

Although FIGS. 1A and 1B depict specific borehole configurations, it should be understood that the present disclosure is equally well suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used, for example, in other well operations such as production tubing operations, jointed tubing operations, coiled tubing operations, combinations thereof, and the like.

Figure 2A:
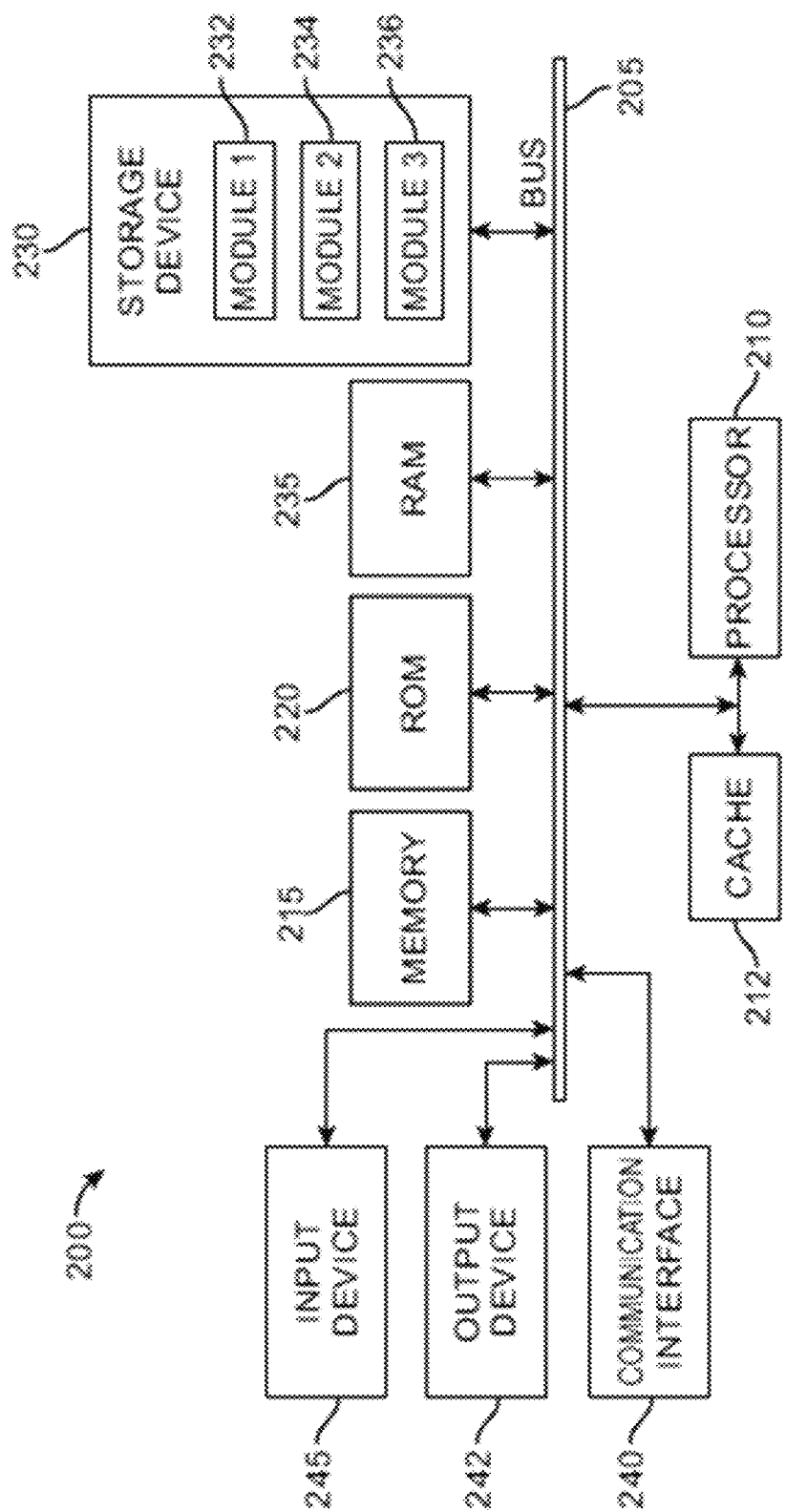
FIGS. 2A and 2B are schematic diagrams of example system embodiments.
Figure 2B:
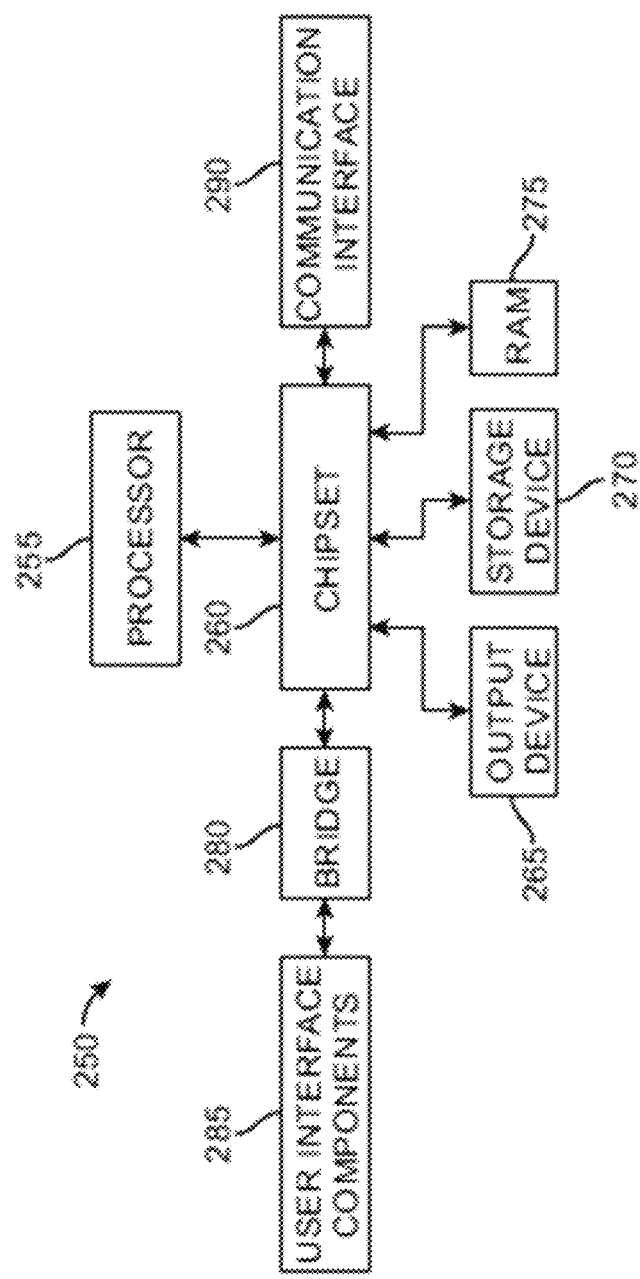

FIGS. 2A and 2B illustrate exemplary computing systems for use with example tools and systems (e.g., downhole tool 26, downhole tool 34, surface equipment, and the like). The more appropriate embodiment will be apparent to those of ordinary skill in the art when practicing the present technology. Persons of ordinary skill in the art will also readily appreciate that other system embodiments are possible.

FIG. 2A illustrates system architecture 200 wherein the components of the system are in electrical communication with each other using a bus 205. System architecture 200 can include a processing unit (CPU or processor) 210 and a system bus 205 that couples various system components including the system memory 215, such as read only memory (ROM) 220 and random access memory (RAM) 235, to the processor 210. System architecture 200 can include a cache of high-speed memory connected directly with, in close proximity to, or integrated as part of the processor 210. System architecture 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing system architecture 200, an input device 245 can represent any number of input mechanisms, such as a microphone for speech, a touch-sensitive screen for gesture or graphical input, keyboard, mouse, motion input, speech and so forth. An output device 242 can also be one or more of a number of output mechanisms. In some instances, multimodal systems can enable a user to provide multiple types of input to communicate with the computing system architecture 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 235, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 242, and so forth, to carry out the function.

FIG. 2B illustrates an example computer system 250 having a chipset architecture that can be used in executing the described method and generating and displaying a graphical user interface (GUI). Computer system 250 can be computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. Chipset 260 can output information to output device 265, such as a display, and can read and write information to storage device 270, which can include magnetic media, and solid state media. Chipset 260 can also read data from and write data to storage 275 (e.g., RAM). A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that systems 200 and 250 can have more than one processor 210 or be part of a group or cluster of computing devices networked together to provide greater processing capability.

Figure 3:
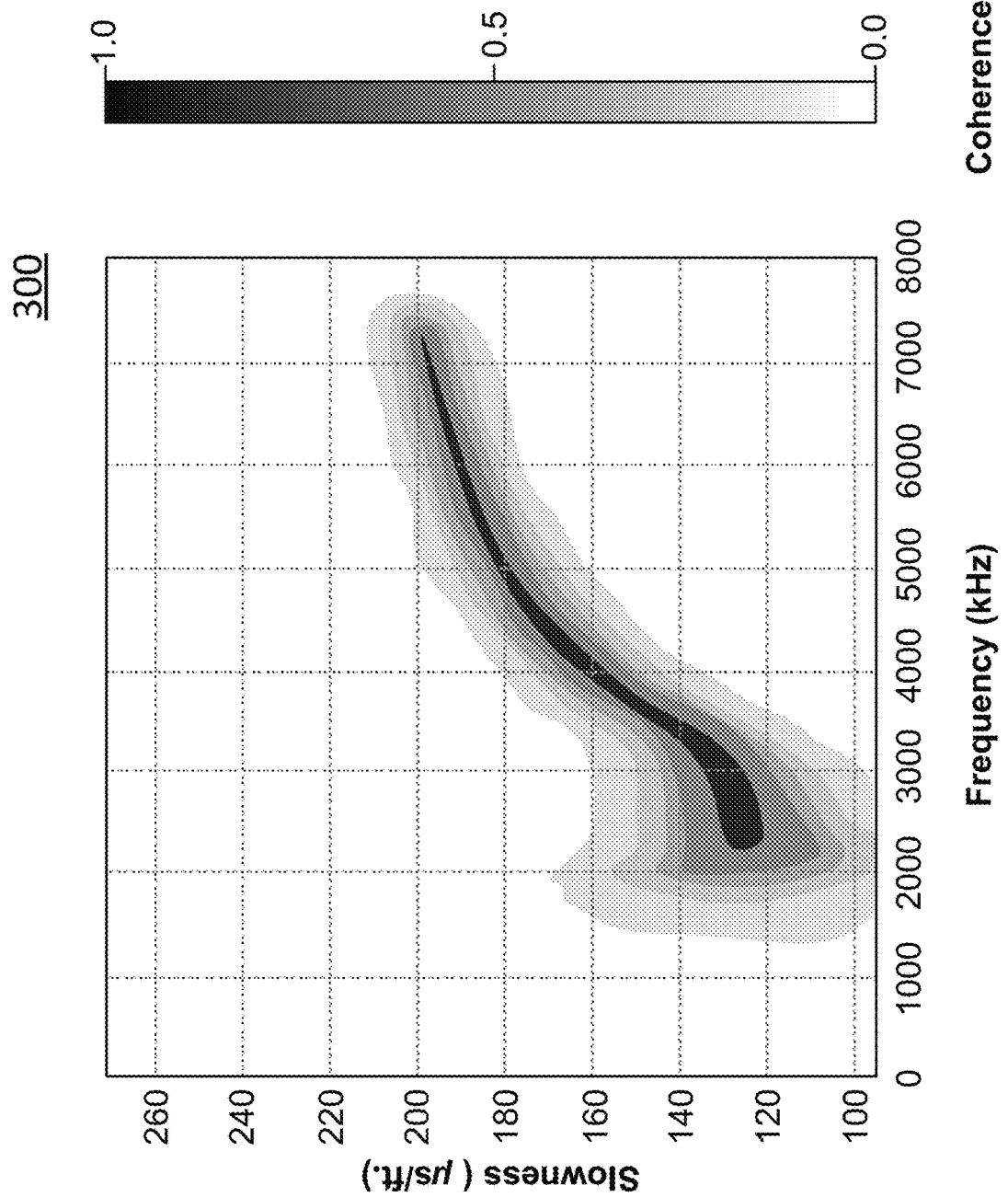
FIG. 3 is a coherence map, graphically representing slowness vs. frequency.

FIG. 3 illustrates a coherence map 300, showing a Differential Phase Frequency Semblance (DPFS) or coherence distribution for acoustic response signals at a given depth in a borehole environment. Coherence map 300 may be generated by, for example, DPFS techniques using, for example, synthetic dipole borehole array waveforms with added road noise.

As discussed above, an acoustic logging tool transmits acoustic signals in a borehole and receives acoustic response signals based on signal propagation through the borehole and surrounding formations. The acoustic response signals or waveforms are received by a receiver array and can be processed (e.g., using Fourier transforms, etc.) to generate a coherence semblance map, as illustrated by coherence map 300. Notably, additional processing may be applied (e.g., noise filtering, etc.) as appropriate.

Coherence map 300 is a two-dimensional (2D) map, including a "slowness" axis (μs/ft) and a "frequency" axis (kHz), and presents a distribution of acoustic signal responses (for a given depth) according to their respective slowness and frequency value. Unlike a dispersion curve or dispersion function, the distribution of response signals include multiple slowness values for each frequency.

Notably, the semblance contours "thicken" at low frequencies, indicating a "slowness" asymptote or a low frequency response asymptote. This slowness asymptote/low frequency response asymptote, as discussed above, may be used to extract (or estimate) the formation slowness of the surrounding formation (e.g., virgin formation slowness). However, uncertainty of the extracted slowness asymptote value increases toward the lower frequency region. In addition, logging tool interferences, borehole rugosity, and near well bore formation damage can further increase the uncertainty of the extracted slowness asymptote value or answer. In fact, according to a data driven dipole processing method, the slowness asymptote is often biased faster than a peak semblance value of the asymptote (in this low frequency band), but it is still within the adequate confidence level at such frequency.

A dispersion processing method is a data driven and model constraint inversion method. This dispersion processing method works well with acoustic logging tools, which provide high quality waveforms. As previously discussed and shown in FIG. 3, the uncertainty of the 2D DPFS coherence map increases toward lower frequencies. In order to regulate and better match the physics within the borehole, it is preferable to perform an additional mapping function to cover all possible slowness solutions and control the spread of the solutions as the frequency moves higher and noise becomes smaller. Notably, during experimentation, the correct formation slowness value is often biased below the peak semblance of acoustic signal responses for a low-frequency range, discussed in greater detail below. Accordingly, a dispersion curve alone (or its derivatives) may not be accurate enough to provide QC for the formation slowness answers.

Accordingly, the techniques disclosed herein use variable density log (VDL) methods to validate extracted shear or compressional slowness by further mapping slowness dispersion responses illustrated by coherence map 300 into a 1D VDL map with computed confidence contour.

Figure 4:
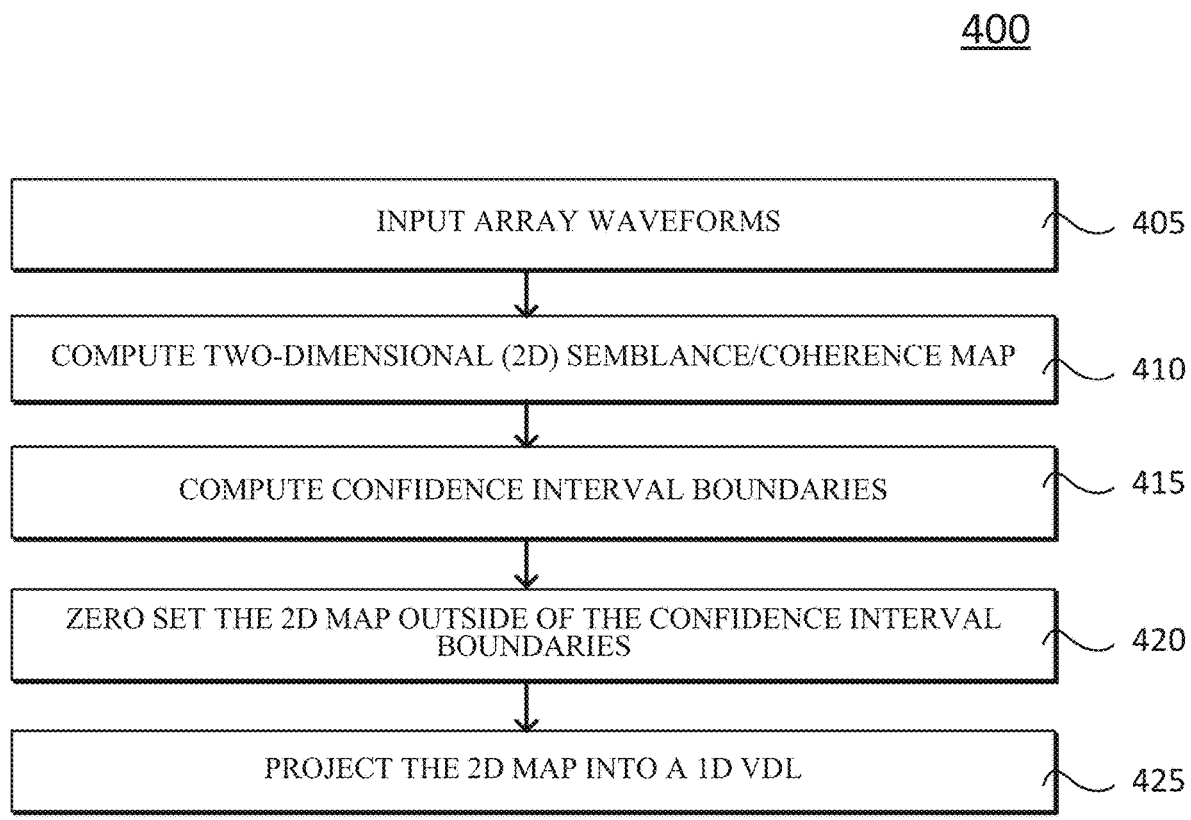
FIG. 4 is an exemplary procedure for identifying and visually presenting formation slowness based on low-frequency dispersion asymptotes according to one embodiment of this disclosure.

For example, FIG. 4 provides a procedure 400, showing several steps of the disclosed 1D VDL mapping techniques. First, in step 405, array waveforms (e.g., response signals) from a sonic logging tool are input into a signal analysis system. Next, in step 410, a slowness-frequency (2D) coherence or semblance map is computed using a frequency-domain dispersion analysis method, for example, the Differential Phase Frequency Semblance (DPFS) method. From here, the confidence contour or confidence interval boundaries for each frequency is computed at step 415 (e.g., using a confidence computing method). Notably, the confidence interval boundaries may be specific to a particular target mode of operation. In this fashion, each mode may have a corresponding confidence interval boundary or boundaries. Thereafter, data points outside the confidence contour/interval boundaries are filtered (e.g., set to zero) in step 420. Next, in step 425, the remaining data points (e.g., the data points within the confidence contour) are projected into a 1-dimensional (1D) Variable Density Log (VDL) map.

As a non-limiting example, a global coherence threshold can be built to indicate the acceptable confidence level using equation (1) below, where Coh(s, f) denotes the 2D coherence map and $Coh_{thr}$ is the coherence threshold for generating confidence contour which could be obtained by field and/or lab calibration testing for any specific sonic logging tool structure.

$$Coh(s,f) > Coh_{thr} \qquad (1)$$

However, as indicated in FIG. 3, the semblance spread decreases toward higher frequencies. Thus, it is preferable to use a dynamic threshold level that changes with the frequency. Therefore, another method that could be adopted for confidence level computing is to compute the level at each frequency using a dynamic coherence threshold. This dynamic threshold is adaptively determined by the coherence maximum at each frequency. For instance, equations (2) and (3) below may be used to determine the upper limit of the confidence range:

$$Coh\left(\frac{Conf_{upper}(f) - s_{peak}(f)}{\left(\frac{f}{f_0}\right)\beta} + s_{peak}(f), f\right) = \alpha * Coh_{peak}(f) \qquad (2)$$

$$Conf_{upper}(f) > s_{peak}(f) \qquad (3)$$

Similarly, equations (4) and (5) below may be used to determine the lower limit of the confidence range:

$$Coh\left(\frac{Conf_{lower}(f) - s_{peak}(f)}{\left(\frac{f}{f_0}\right)\beta} + s_{peak}(f), f\right) = \alpha * Coh_{peak}(f) \qquad (4)$$

$$Conf_{lower}(f) < s_{peak}(f) \qquad (5)$$

In the equations above, $Coh_{peak}(f)$ and $s_{peak}(f)$ denote the coherence value and slowness value that corresponding to the peak semblance at each frequency, and $Conf_{upper}(f)$ and $Conf_{lower}(f)$ are the upper and lower boundaries of the confidence interval having a unit of slowness. In addition, $\alpha$ is the coherence ratio utilized to help determining the confidence interval, $f_0$ and $\beta$ are adjustable parameters to dynamically modify the distribution rule of the confidence interval at different frequencies.

Figure 5:
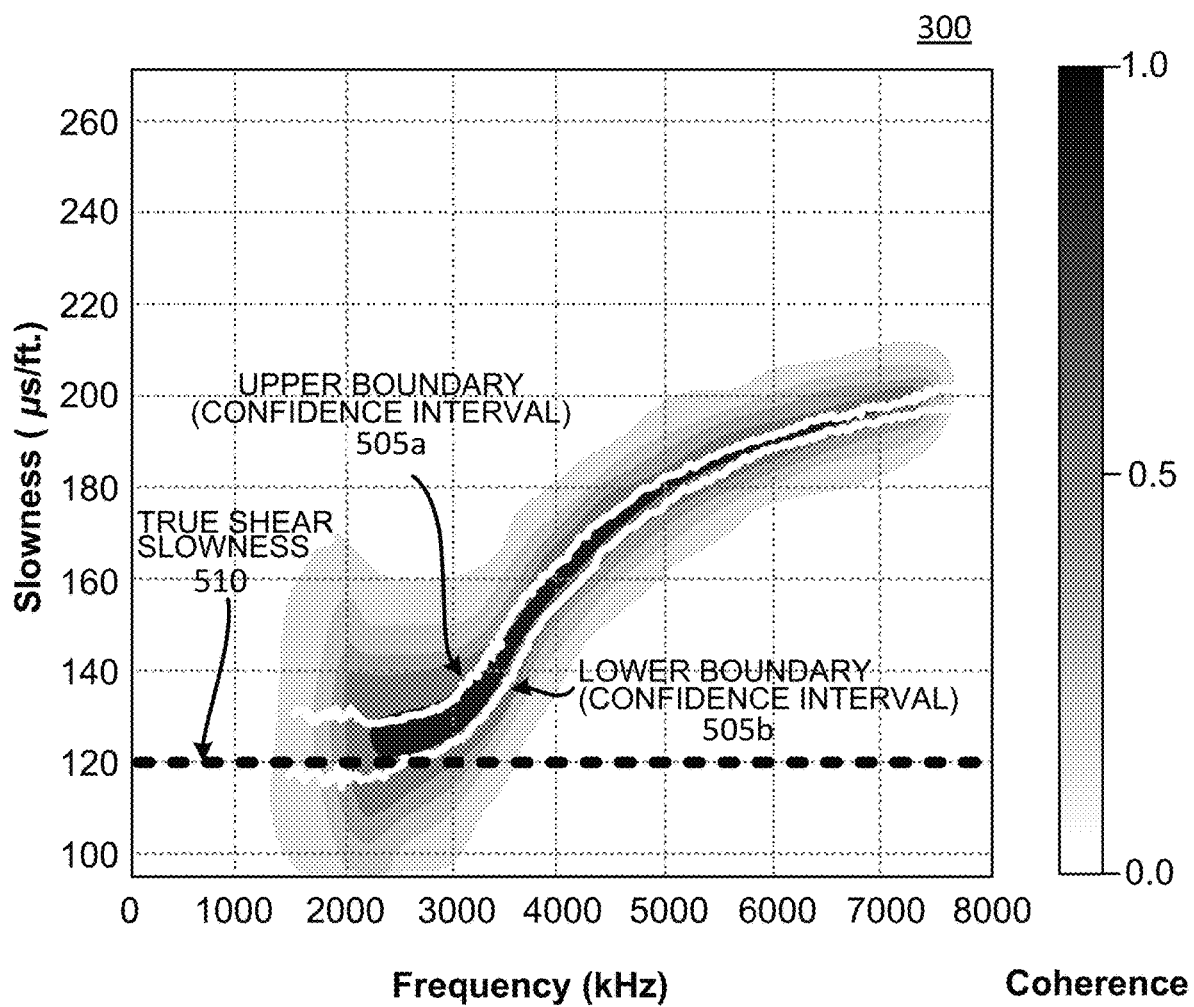
FIG. 5 is the coherence map shown in FIG. 3, further showing confidence intervals or confidence boundaries.

FIG. 5 illustrates confidence interval boundaries 505a and 505b computed by equations (2)-(5) overlaid on coherence map 300. It can be seen that although the semblance values of the low-frequency flexural signals are spread to a large value due to the road noise and fixed array size, the confidence interval computing is able to include the potential true shear slowness as long as the SNR allows for the capture of the actual signals.

Figure 6:
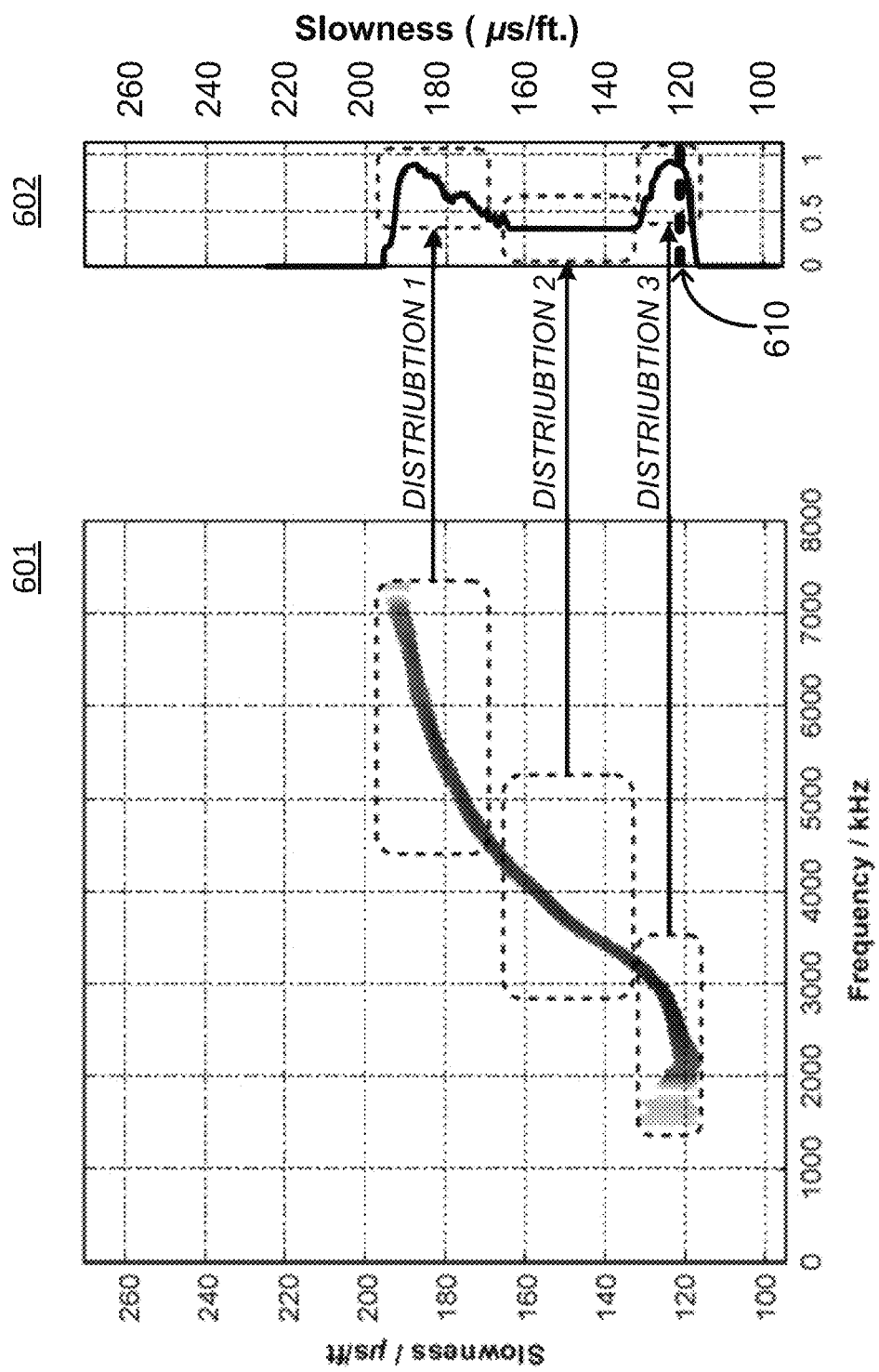
FIG. 6 is a reserved coherence map, showing coherence values of the coherence map shown in FIG. 3, filtered according to respective intervals shown in FIG. 5, and a one-dimensional (1D) Variable Density Log (VDL) map generated from coherence values in the reserved coherence map.

After the upper and lower confidence boundaries (505a, 505b, respectively) are obtained, the response signal values outside of the confidence contour in the slowness-frequency 2D coherence/semblance map are filtered (e.g., set to zero) to generate a reserved slowness-frequency coherence map, as shown in FIG. 6.

FIG. 6 particularly illustrates a reserved slowness-frequency coherence map 601, showing response signals and corresponding coherence values filtered by the confidence boundaries 505a, 505b. From here, a mapping function can be applied to reserved coherence map 601 to transform it into a new 1-dimensional (1D) Variable Density Log (VDL) map 602 (e.g., a probability density histogram), showing the shear slowness values in log-form.

One way to transform the signal responses, illustrated by reserved coherence map 601, into the VDL map 602 is to use a Slowness Density Log (SDL) function, which calculates a summation of acoustic response signals (e.g., the total number of signal responses) for a given frequency range (e.g., frequency ranges corresponding to distribution 1, 2, and 3) and plots the summation of signal responses in VDL map 602. For example, the summation may be calculated according to equation (6) below.

$$SDL(s) = \Sigma_{f=f_1}^{f=f_{max}} Coh(s,f) \qquad (6)$$

However, it is preferable to use a Normalized Slowness Density Log (NSDL) function to map the slowness values, as defined by equation (7) below, where $f_{max}$ denotes the maximum frequency range to be considered and length[Coh(s, f)>0] denotes the number of frequency points with coherence values larger than 0, and $\Sigma_{f=f_1}^{f=f_{max}} Coh(s, f)$ denotes the summation of all the coherence values along the frequency axis for a specific slowness s. In addition, $n_f$ is the number of frequency points between $f_{max}$ and $f_1$, and a is an empirical adjustable parameter.

$$NSDL(s) = \exp\left(-\min\left\{\frac{\max(1, n_f a)}{\left[\sum_{f=f_1}^{f=f_{max}} Coh(s, f)\right]^2}, \frac{\text{length}[Coh(s, f) > 0]}{\sum_{f=f_1}^{f=f_{max}} Coh(s, f)}\right\}\right) \quad (7)$$

The first function in equation (7), $$\frac{\max(1, n_f a)}{\left[\sum_{f=f_1}^{f=f_{max}} Coh(s, f)\right]^2},$$

uses the square of the sum of coherence values to enhance the color when mapping the dispersion severity into the 1D VDL map 602. In other words, flatter dispersions result in a higher coherence value and which is indicated by a greater color contrast. For example, the low-frequency slowness and high-frequency slowness of flexural waves approach shear wave slowness and Scholte wave slowness, respectively. Consequently, the VDL map for flexural waves has two obvious histogram "peaks" (e.g., peak semblances) if a broad bandwidth dipole transmitter is used, where the one with lower slowness is for the low-frequency asymptote, the other one with higher slowness value is for the high-frequency asymptote.

Here, the second distribution, which corresponds to "distribution 2" and a dispersive transition between 3 kHz and 5 kHz, may make the VDL become a very low value (e.g., close to zero) because the dispersion response is very precipitous. At this point, use of this expression becomes inappropriate, as zero denotes no modes in the VDL, however, but it is clear that the dispersive response for distribution 2 is significant with high coherence.

To overcome the shortcomings of the first function in equation (7), a second function, $$\frac{\text{length}[Coh(s, f) > 0]}{\sum_{f=f_1}^{f=f_{max}} Coh(s, f)},$$

can be added to map an average coherence value in the confidence interval to the 1D VDL. The second function works mainly in the frequencies where the target modes are highly dispersive, for example, the frequencies near the Airy-phase frequency of flexural waves.

For instance, FIG. 6 shows a corresponding NSDL response in VDL map 602 (at the right side of coherence map 601). VDL map 602 includes two "peak" semblances, which denote respective "flat" slowness responses for certain frequency ranges in coherence map 601. These two peak semblances are generated by the first function, while the middle part, corresponding to distribution 2, denotes the transition zone when flexural slowness moves from shear wave slowness to the Scholte wave slowness, and this part is computed by the second function of equation (7). Additionally, the introduction of the natural exponential operator normalizes the NSDL value to be between 0 and 1. For the specific case that no mode exists in the 2D map for the current slowness point, the NSDL value equals to zero; for another specific case of a non-dispersive mode, or a weak-dispersive mode, the NSDL value approaches 1 at the slowness of the target mode.

The mapping function in equation (7) provides the relative intensity of the dispersion response at each slowness grid. For such VDLs, the slowness pick should be made at a front edge of a first local maximum for dipole flexural waves. For example, in FIG. 6, two local maximums or peaks exist in the plot, and they denote a low-frequency asymptote (distribution 3) and a high-frequency asymptote (distribution 1), respectively. The shear slowness estimate (i.e., the formation shear estimate at a given depth) is displayed by a horizontal dash line 610 and, for the example below, is located at a "front edge" of the low-frequency asymptote or first local maximum, which indicates the shear slowness pick is correct and accurate.

Figure 7:
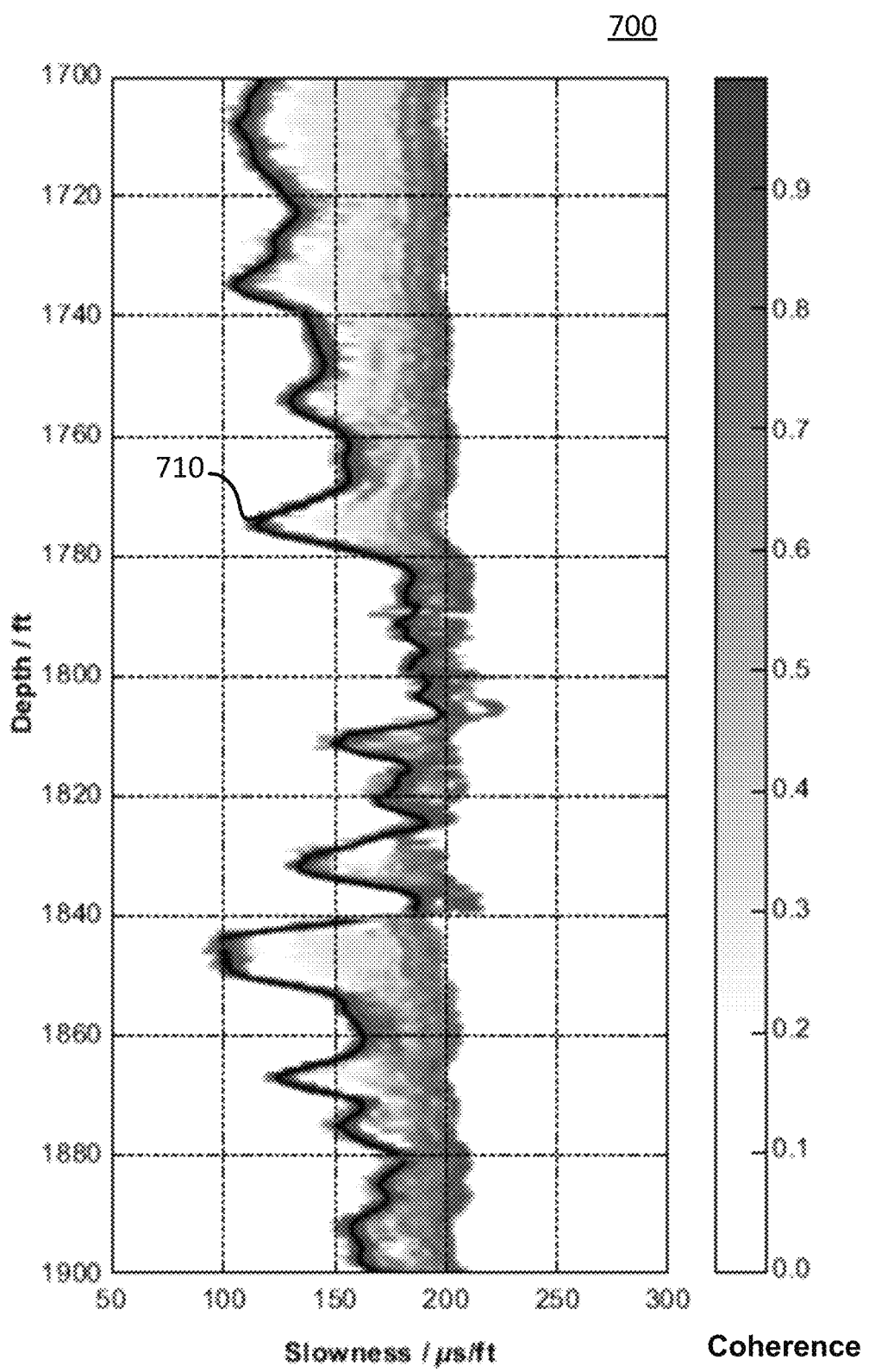
FIG. 7 is a 2D semblance map of a wellbore hole, showing a quality control slowness curve.

FIG. 7 is a 2D semblance map 700 of a wellbore hole, showing a quality control slowness curve 710 (e.g., a formation slowness curve) based on the processing of dipole waveforms in a test well. Semblance map 700 illustrates a VDL computed in accordance with the present disclosure and provides a grey-map scale ("coherence") key shown on to the right.

Semblance map 700 also shows two groups of high-value banding, with values close to 1, which correspond to low and high-frequency asymptotes—e.g., the low/high frequency asymptotes (ref. FIG. 6) include a high density of slowness values. Notably, between the low/high frequency asymptotes (e.g., a middle region, corresponding to distribution 2 in FIG. 6) contains relatively fewer points since the density of slowness values is lower for a given slowness. A formation slowness or a shear slowness "pick" (i.e., the formation shear estimate at a given depth) is shown by a quality control slowness curve 710 (here, a black line) located at a front edge of the first group of high value banding (e.g., corresponding to distribution 3), indicating that the pick is very reliable and accurate.

It can be seen in FIG. 7 that sections of the wellbore where the 2D semblance map is accurately resolved have a high value band (dark color) near the left and right edges of the slowness validation display, and a lower value band (lighter color) in the middle. The presence of the high and low energy bands, as well as their relative thicknesses, provides a visual indicator of the quality and structure of the semblance map for dipole shear data.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: A method for visually identifying and presenting formation slowness based on low-frequency slowness dispersion asymptotes, the method comprising: receiving, by a logging tool, acoustic signal responses from adjacent formations at a plurality of depths in a borehole environment; mapping a distribution of the acoustic signal responses at each depth according to slowness and a frequency values; determining a confidence interval to define at least one coherence threshold for the distribution of the acoustic signal responses at each depth; generating a variable density log for each depth based on the distribution of acoustic signals responses that satisfy the confidence interval for one or more frequency ranges; determining a formation slowness value for each depth based on the variable density log for the each depth; and presenting a semblance map that includes a slowness axis, a depth axis, the formation slowness value for each depth, and at least a portion of the distribution of acoustic signal responses at each depth.

Statement 2: The method of Statement 1, wherein determining the formation slowness value further comprises determining a low frequency asymptote based on a peak semblance of acoustic signal responses for the one or more frequency ranges; and determining the formation slowness value based on the low frequency asymptote.

Statement 3: The method of Statement 1, wherein generating the variable density log further comprises: determining a summation of acoustic responses for each frequency range of the one or more frequency ranges; and plotting the summation of acoustic responses for each frequency range in the variable density log.

Statement 4: The method of one or more of Statements 1 through 3, wherein the confidence interval defines an upper coherence threshold and a lower coherence threshold for one or more frequency ranges.

Statement 5: The method of one or more of Statements 1 through 4, wherein the acoustic signal responses correspond to dipole borehole mode waveforms.

Statement 6: The method of one or more of Statements 1 through 5, further comprising transmitting, by the logging tool, acoustic signals at the plurality of depths in the borehole environment.

Statement 7: The method of Statement 6, further comprising transmitting the acoustic signals using at least one of a monopole source, a dipole source, or a quadrupole source.

Statement 8: The method of one or more of Statements 1 through 5, further comprising generating a reserved coherence map for each depth by applying the confidence interval to the distribution of the acoustic signal responses at each depth.

Statement 9: The method of one or more of Statements 1 through 5, further comprising generating a formation slowness curve based on the formation slowness value for each depth, wherein semblance map includes the formation slowness curve.

Statement 10: The method of one or more of Statements 1 through 9, wherein presenting the semblance map, further comprises emphasizing the formation slowness value for each depth by at least one of a color or a line thickness.

Statement 11: A system operable in a wellbore environment comprising an acoustic logging tool having a receiver array configured to receive a plurality of waveforms; at least one processor in communication with the acoustic logging tool; a non-transitory computer-readable storage medium configured to store instructions, the instructions, when executed by the at least one processor, cause the at least one processor to receive acoustic signal responses from adjacent formations at a plurality of depths in a borehole environment; map a distribution of the acoustic signal responses at each depth according to slowness and a frequency values; determine a confidence interval to define at least one coherence threshold for the distribution of the acoustic signal responses at each depth; generate a variable density log for each depth based on the distribution of acoustic signals responses that satisfy the confidence interval for one or more frequency ranges; determine a formation slowness value for each depth based on the variable density log for the each depth; and present a semblance map that includes a slowness axis, a depth axis, the formation slowness value for each depth, and at least a portion of the distribution of acoustic signal responses at each depth.

Statement 12: The system of Statement 11, wherein the instructions, when executed to determine the formation slowness value, further cause the at least one processor to determine a low frequency asymptote based on a peak semblance of acoustic signal responses for the one or more frequency ranges; and determine the formation slowness value based on the low frequency asymptote.

Statement 13: The system of one or more of Statements 11 through 12, wherein the instructions, when executed to generate the variable density log, further cause the at least one processor to determine a summation of acoustic responses for each frequency range of the one or more frequency ranges; and plot the summation of acoustic responses for each frequency range in the variable density log.

Statement 14: The system of one or more of Statements 11 through 13, wherein the confidence interval defines an upper coherence threshold and a lower coherence threshold for one or more frequency ranges.

Statement 15: The system of one or more of Statements 11 through 14, wherein the instructions, when executed, further cause the at least one processor to transmit acoustic signals at the plurality of depths in the borehole environment.

Statement 16: The system of Statement 15, wherein the instructions, when executed, further cause the at least one processor to transmit the acoustic signals using at least one of a monopole source, a dipole source, or a quadrupole source.

Statement 17: The system of one or more of Statements 11 through 14, wherein the instructions, when executed, further cause the at least one processor to generate a formation slowness curve based on the formation slowness value for each depth, wherein semblance map includes the formation slowness curve.

Statement 18: The system of one or more of Statements 11 through 17, wherein the instructions, when executed to present the semblance map, further cause the at least one processor to emphasize the formation slowness value for each depth by at least one of a color or a line thickness.

Statement 19: A tangible, non-transitory, computer-readable media having instructions encoded thereon, the instructions, when executed by a processor, are operable to receive acoustic signal responses from adjacent formations at a plurality of depths in a borehole environment; map a distribution of the acoustic signal responses at each depth according to slowness and a frequency values; determine a confidence interval to define at least one coherence threshold for the distribution of the acoustic signal responses at each depth; generate a variable density log for each depth based on the distribution of acoustic signals responses that satisfy the confidence interval for one or more frequency ranges; determine a formation slowness value for each depth based on the variable density log for the each depth; and present a semblance map that includes a slowness axis, a depth axis, the formation slowness value for each depth, and at least a portion of the distribution of acoustic signal responses at each depth.

Statement 20: The tangible, non-transitory, computer-readable media of Statement 19, wherein the instructions, when executed to determine the formation slowness value, further cause the processor to determine a low frequency asymptote based on a peak semblance of acoustic signal responses for the one or more frequency ranges; and determine the formation slowness value based on the low frequency response asymptote.

What is claimed is:

1. A method, comprising:
receiving, by a logging tool, acoustic signal responses from adjacent formations at a plurality of depths in a borehole environment;
mapping a distribution of the acoustic signal responses at each depth according to slowness and frequency values;
determining at least one confidence interval to define at least one coherence threshold for the distribution of the acoustic signal responses at each depth;
generating a variable density log for each depth based on the distribution of acoustic signal responses that satisfy the at least one confidence interval for one or more frequency ranges;
determining a formation slowness value for each depth based on the variable density log for the each depth; and
presenting a semblance map that includes a slowness axis, a depth axis, the formation slowness value for each depth, and at least a portion of the distribution of acoustic signal responses at each depth.

2. The method of claim 1, wherein determining the formation slowness value further comprises:
determining a low frequency asymptote based on a peak semblance of acoustic signal responses for the one or more frequency ranges; and
determining the formation slowness value based on the low frequency asymptote.

3. The method of claim 1, wherein generating the variable density log further comprises:
determining a summation of acoustic responses for each frequency range of the one or more frequency ranges; and
plotting the summation of acoustic responses for each frequency range in the variable density log.

4. The method of claim 1, wherein the at least one confidence interval defines an upper coherence threshold and a lower coherence threshold for one or more frequency ranges.

5. The method of claim 1, wherein the acoustic signal responses correspond to dipole borehole mode waveforms.

6. The method of claim 1, further comprising:
transmitting, by the logging tool, acoustic signals at the plurality of depths in the borehole environment.

7. The method of claim 6, further comprising:
transmitting the acoustic signals using at least one of a monopole source, a dipole source, or a quadrupole source.

8. The method of claim 1, further comprising:
generating a reserved coherence map for each depth by applying the at least one confidence interval to the distribution of the acoustic signal responses at each depth.

9. The method of claim 1, further comprising:
generating a formation slowness curve based on the formation slowness value for each depth, wherein the semblance map includes the formation slowness curve.

10. The method of claim 1, wherein presenting the semblance map, further comprises:
emphasizing the formation slowness value for each depth by at least one of a color or a line thickness.

11. A system for acoustic logging, comprising:
an acoustic logging tool having a receiver array configured to receive a plurality of waveforms;
at least one processor in communication with the acoustic logging tool;
a non-transitory computer-readable storage medium configured to store instructions, the instructions, when executed by the at least one processor, cause the at least one processor to:
receive acoustic signal responses from adjacent formations at a plurality of depths in a borehole environment;
map a distribution of the acoustic signal responses at each depth according to slowness and frequency values;

determine at least one confidence interval to define at least one coherence threshold for the distribution of the acoustic signal responses at each depth;

generate a variable density log for each depth based on the distribution of acoustic signal responses that satisfy the at least one confidence interval for one or more frequency ranges;

determine a formation slowness value for each depth based on the variable density log for the each depth; and present a semblance map that includes a slowness axis, a depth axis, the formation slowness value for each depth, and at least a portion of the distribution of acoustic signal responses at each depth.

12. The system of claim 11, wherein the instructions, when executed to determine the formation slowness value, further cause the at least one processor to:

determine a low frequency asymptote based on a peak semblance of acoustic signal responses for the one or more frequency ranges; and determine the formation slowness value based on the low frequency asymptote.

13. The system of claim 11, wherein the instructions, when executed to generate the variable density log, further cause the at least one processor to:

determine a summation of acoustic responses for each frequency range of the one or more frequency ranges; and plot the summation of acoustic responses for each frequency range in the variable density log.

14. The system of claim 11, wherein the at least one confidence interval defines an upper coherence threshold and a lower coherence threshold for one or more frequency ranges.

15. The system of claim 11, wherein the instructions, when executed, further cause the at least one processor to:

transmit acoustic signals at the plurality of depths in the borehole environment.

16. The system of claim 15, wherein the instructions, when executed, further cause the at least one processor to:

transmit the acoustic signals using at least one of a monopole source, a dipole source, or a quadrupole source.

17. The system of claim 11, wherein the instructions, when executed, further cause the at least one processor to:

generate a formation slowness curve based on the formation slowness value for each depth, wherein the semblance map includes the formation slowness curve.

18. The system of claim 11, wherein the instructions, when executed to present the semblance map, further cause the at least one processor to:

emphasize the formation slowness value for each depth by at least one of a color or a line thickness.

19. A tangible, non-transitory, computer-readable media having instructions encoded thereon, the instructions, when executed by a processor, are operable to:

receive acoustic signal responses from adjacent formations at a plurality of depths in a borehole environment;

map a distribution of the acoustic signal responses at each depth according to slowness and frequency values;

determine at least one confidence interval to define at least one coherence threshold for the distribution of the acoustic signal responses at each depth;

generate a variable density log for each depth based on the distribution of acoustic signal responses that satisfy the at least one confidence interval for one or more frequency ranges;

determine a formation slowness value for each depth based on the variable density log for the each depth; and present a semblance map that includes a slowness axis, a depth axis, the formation slowness value for each depth, and at least a portion of the distribution of acoustic signal responses at each depth.

20. The tangible, non-transitory, computer-readable media of claim 19, wherein the instructions, when executed to determine the formation slowness value, further cause the processor to:

determine a low frequency asymptote based on a peak semblance of acoustic signal responses for the one or more frequency ranges; and determine the formation slowness value based on the low frequency response asymptote.

* * * * *